United States Patent [19]

Bell, Jr. et al.

[11] 4,320,278
[45] Mar. 16, 1982

[54] SERVO FEED SYSTEM FOR ELECTRICAL DISCHARGE MACHINING APPARATUS

[75] Inventors: Oliver A. Bell, Jr., Statesville; Randall C. Gilleland, Troutman; Davey J. Chance, Concord, all of N.C.

[73] Assignee: Colt Industries Operating Corp, New York, N.Y.

[21] Appl. No.: 23,634

[22] Filed: Mar. 26, 1979

[51] Int. Cl.³ .............................................. B23P 1/02
[52] U.S. Cl. ................................ 219/69 G; 219/69 C
[58] Field of Search .................. 219/69 G, 69 P, 69 C

[56] References Cited

U.S. PATENT DOCUMENTS

| | | | |
|---|---|---|---|
| 3,485,992 | 12/1969 | Sennowitz | 219/69 G |
| 3,558,998 | 1/1971 | Bertolasi | 219/69 C |
| 3,996,445 | 12/1976 | Wohlabaugh | 219/69 G |

FOREIGN PATENT DOCUMENTS 407701  6/1974  U.S.S.R. .............................. 219/69 C

*Primary Examiner*—C. C. Shaw
*Attorney, Agent, or Firm*—Harry R. Dumont

[57] ABSTRACT

The servo circuit is operable to monitor gap conditions on any number of working leads up to four at the same time. It further has the capability of responding to high voltage operating conditions and then reducing the gap voltage being sensed to an appropriate level. An analog stage is then employed to pick out the most valuable information being provided from the several gap leads. An amplifier of the FET type is used to provide high input impedance to the circuit. An absolute value circuit is further included which in either polarity will rectify the gap signal back to the positive level.

8 Claims, 4 Drawing Figures

SERVO FEED SYSTEM FOR ELECTRICAL DISCHARGE MACHINING APPARATUS

BACKGROUND OF THE INVENTION

The field to which our invention relates is that known as Electrical Discharge Machining, hereinafter referred to as "EDM" in which material is removed from an electrically conductive workpiece by the action of electrical gap discharges between one or more electrodes and the workpiece. In some cases, the standard polarity of the negative electrode and positive workpiece may be reversed. The servo feed system is used to provide relative movement during machining thus to maintain a relatively constant optimum spacing between the electrode and workpiece as material is progressively removed from the workpiece.

A dielectric fluid is circulated and recirculated generally under pressure to the gap throughout the machining operation. For most reliable results, a power supply of the independent pulse generator type is utilized to provide machining power pulses of precisely controllable frequency and duty factor. One type of multivibrator, particularly suitable for use in an EDM power supply is described and disclosed in Bell, U.S. Pat. No. 3,809,848, issued on May 7, 1974, for "Digitally Controlled Power Supply for Electrical Discharge Machining Apparatus". Servo control circuits employing field effect transistors and used for handling single gap setups are known from Bell, U.S. Pat. No. 3,727,024, issued on Apr. 10, 1973, for "Electrical Discharge Machining Servo Control Circuit" and from Lobur, U.S. Pat. No. 3,558,844, issued on Jan. 26, 1971, for "Electrical Discharge Machining Servo Control Circuit". Both the above-mentioned patents are of common ownership with the present application.

SUMMARY OF THE PRESENT INVENTION

The present invention will be seen to relate to a novel servo feed system which is capable of sensing a plurality of analog inputs from a plurality of EDM gaps at the same time. If the EDM machining is being carried on at a high voltage level, provision is made in the circuit for reducing the working voltage to a level which is comparable with the servo circuit. An analog "or" operation is then performed to cause the servo circuit to respond to the most pertinent information. An FET is included in the buffer amplifier stage and there is further included an absolute value circuit to work in either polarity.

BRIEF DESCRIPTION OF THE DRAWINGS

Reference is now made to the accompanying drawing for a description of the circuit incorporating the present invention with like numerals used to identify like parts as they may appear. The drawings are combined schematic and block diagrammatic showings of the complete electrical discharge machining power supply and servo feed system wherein.

DETAILED DESCRIPTION OF THE PREFERRED EMBODIMENT

Figure 1:
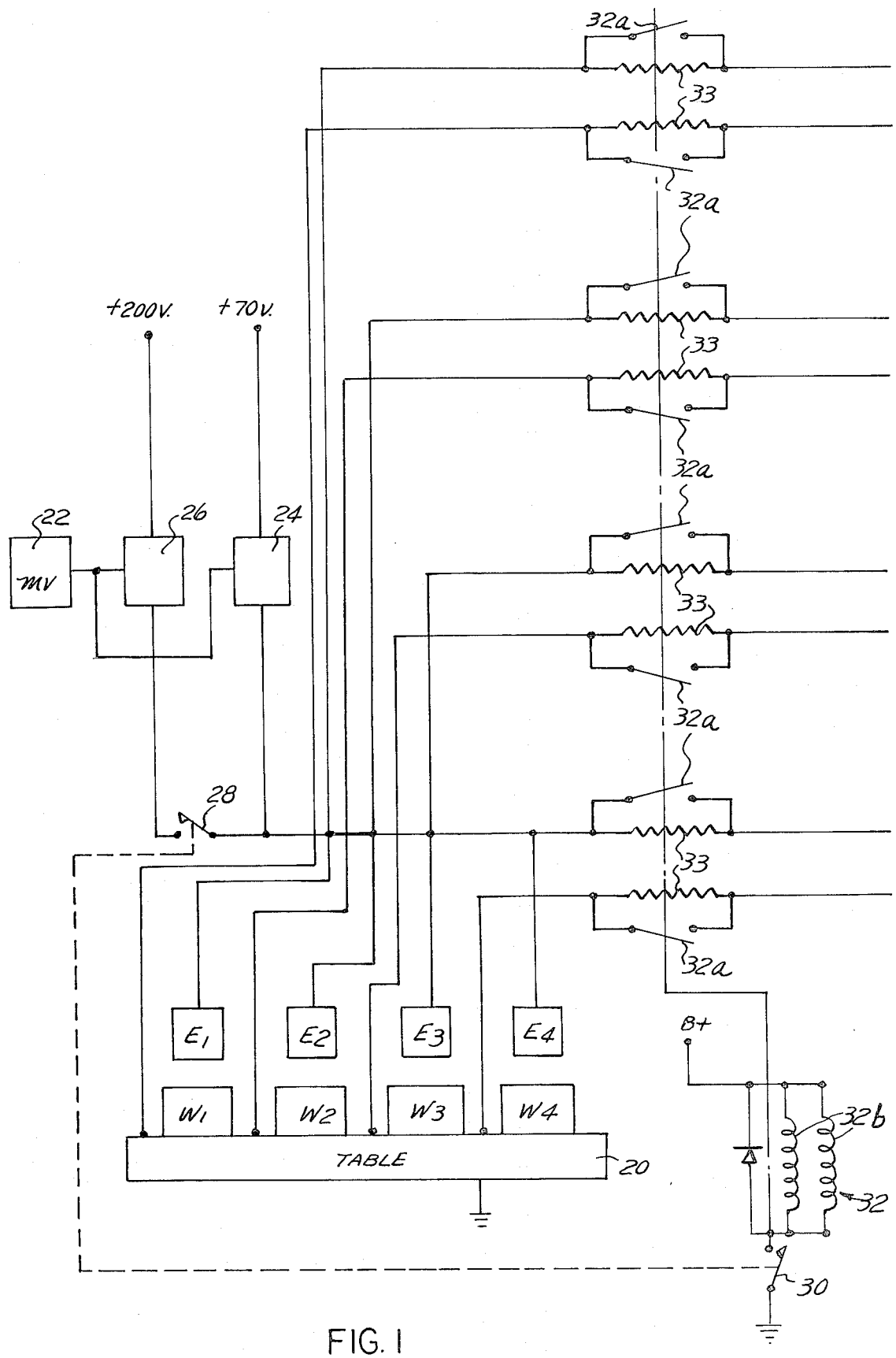
FIG. 1 shows the machining power supply circuit in block form, together with the sensing network used for the input to the servo feed system.

Reference is now made to FIG. 1 for its showing of a multiple gap EDM setup with four electrodes $E_1$-$E_4$ and with four associated workpieces $W_1$-$W_4$ all mounted on the same EDM machine tool table 20. The table 20 is grounded as shown.

A machining power supply circuit is shown at the left hand of the FIG. 1 drawing and includes a multivibrator 22, an output module 24 for regular voltage machining at the ordinary 70 plus volt level and also a different output module 26 for providing high voltage machining at a level of 200 volts or even more. To provide for the high voltage mode of operation, switch 28 is connected in the lead from output module 26 to the four electrodes $E_1$-$E_4$. Upon the closing of switch 28, a second switch 30 is jointly operated to de-energize the coils 32$b$ of the relay 32. Associated contacts 32$a$ are normally closed and each connected in a different one of the sensing leads connected to the electrodes $E_1$-$E_4$. In the standard of 70 volt mode, switch 30 will be open and the relay contacts 32$a$ will be closed so that the voltage sensed will pass directly from each electrode to the analog assembly 34 next following.

The circuit provides for conjoint operation of switches 20 and 28, in a manner well known in the art. In the standard or 70 volt mode, the following conditions exist: switch 28 closed; switch 30 open; coils 32$b$ de-energized; and relay contacts 32$a$ closed. In the high voltage or 200 volt mode, the following conditions exist: switch 28 open; switch 30 closed; coils 32$b$ energized; and relay contacts 32$a$ opened. In this manner it will be seen that the several switches and contacts are controlled as indicated by dash and dot-dash lines to actuate the contacts and switches to provide the operation to be later described. In the high voltage mode of operation, each of the relay contacts 32$a$ will be opened and the resistance of each of the resistors 33 will be connected in circuit.

The analog assembly 34 includes four amplifiers 36. Each of the amplifiers 36 is separate from the others and comprises a differential amplifier so that it can accept either negative or positive voltage signals from the gap of relatively high amplitude. The input voltage may range as high as 100 volts. Each of the differential amplifiers 36 reduces the input voltage by a factor of 10 so that a 70 volt input is reduced to approximately 7 volts on the output of the differential amplifier 36. In the event there exists a short circuit condition in any of the gaps, the output for that particular sensing lead would be zero volts.

Each of the differential amplifiers 36 has associated with it a B+ operating voltage source. Each of the amplifiers 36 further has associated with it a resistor 38 and 40 connected in its input leads. The positive input lead of each amplifier 36 is further connected to ground through a resistor 42, as shown. A further external timing network comprising an RC network with a resistor 44 and a shunt capacitor 46 is included. An operating minus and plus voltage source are further connected to each amplifier 36 as illustrated. The next following stage is a diode "or" 50. The voltage at whichever one of the four gaps sensed is closest to zero voltage is the voltage that will be selected.

Figure 3:
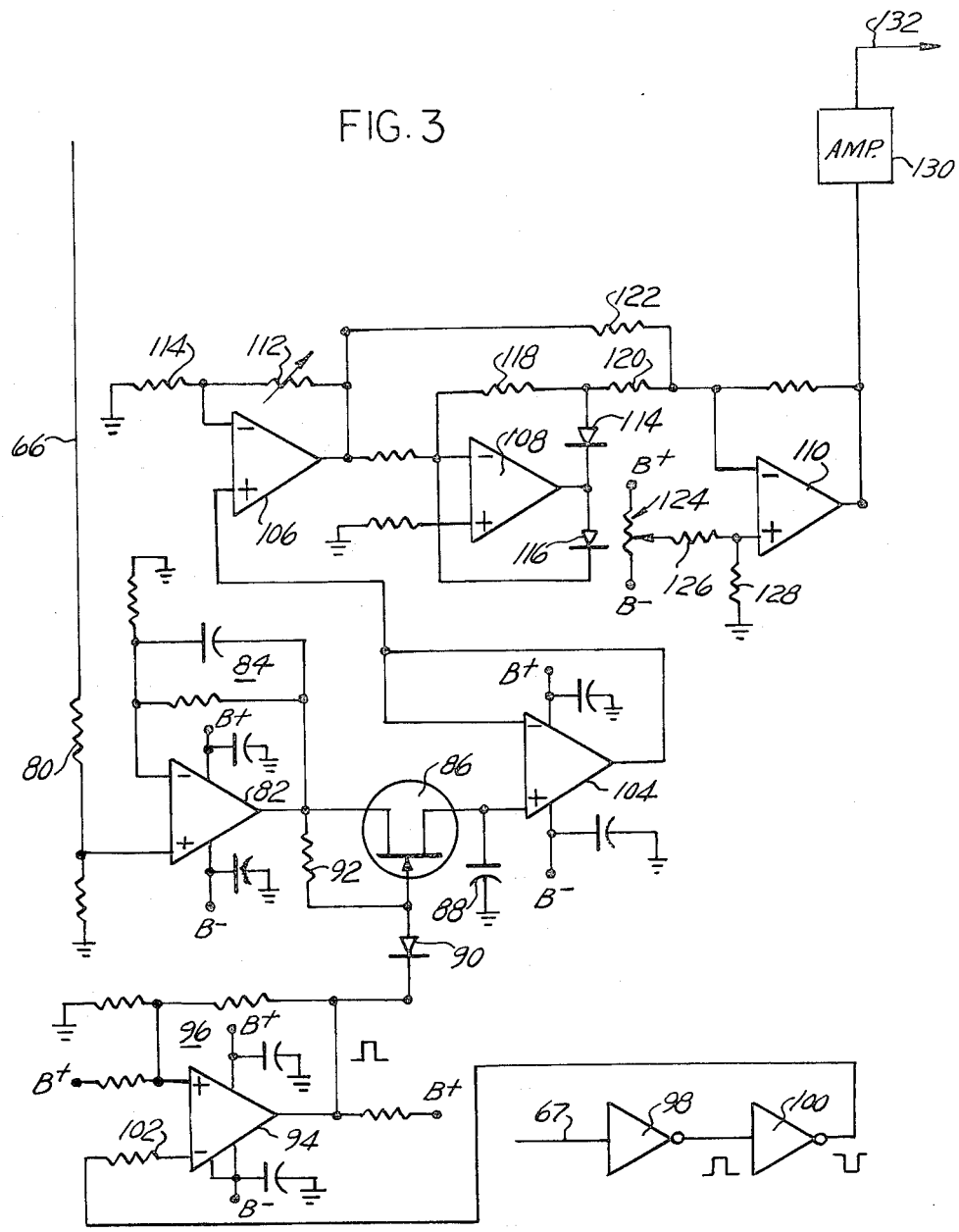
FIG. 3 is a schematic drawing showing the output of the sensing circuit and the control circuit associated with it.

A further differential amplifier 52 is connected in circuit and receives an input signal which is either plus or minus depending on what polarity the machining operation is being conducted at. If the polarity switch is in the standard polarity with negative electrodes $E_1$-$E_4$, then the output from the amplifier 52 will be positive. In a like manner to the four amplifiers 36, series resistors 39, 41, and resistor 43 are connected with the input terminals of the amplifier 52. Also, plus and minus voltage sources are connected as shown with an additional external capacitor 55. The diode array 50 includes a plurality of diodes 56. In the standard polarity condition, a positive voltage is passed through resistors 58 and 60 to each side of the array of diodes 56. The positive voltage forward biases these diodes through a resistor 60 and back to the output of the amplifiers 36 so that the amplifier with the lowest voltage will be sensed. Diodes 62 and 64 are further included in circuit to provide an appropriate output through the lead 66 to the FIG. 3 circuit.

Figure 2:
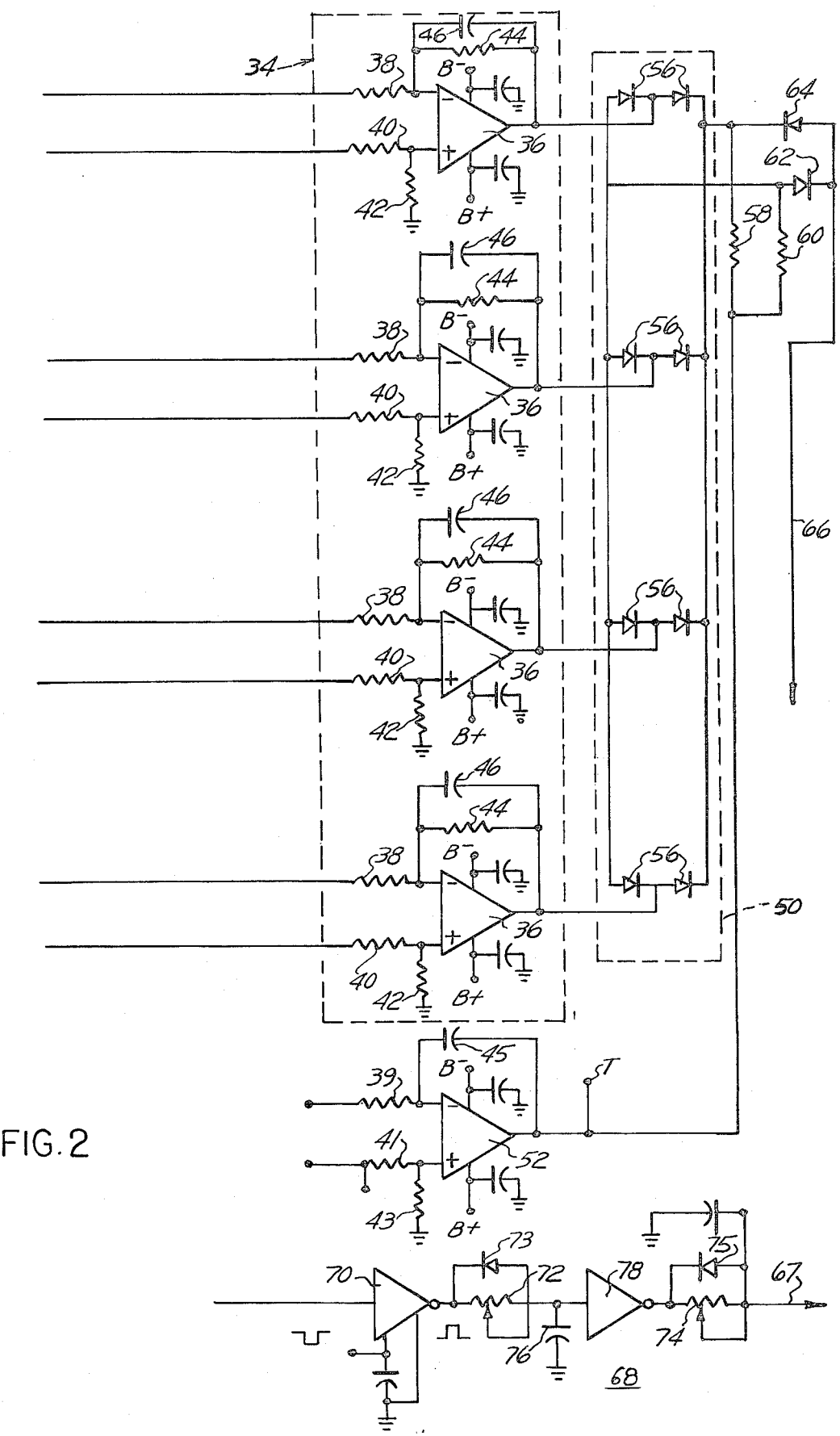
FIG. 2 is a schematic drawing showing the analog network used to select the most significant gap voltage signal from the several different gaps.

Also shown at the bottom of the FIG. 2 circuit is a keying network 68 which is adapted to receive a negative going pulse input from the power supply multivibrator 22. Each pulse is inverted in inverter stages 70 and 78. This circuit generates a signal which is exactly like the multivibrator signal but delayed by some preset time with the time determined by the value of the resistor 72 and 74. Each resistor 72, 74 is shunted by a diode 73, 75, respectively, and capacitor 76 is connected in circuit as shown.

Generally, the signal output from the network 68 is delayed by 100 to 300 nanoseconds. This delay serves to place the gating signal being passed to the sample and hold portion of the FIG. 3 circuit back in phase with the signal occurring at the gap. This delay is inherent in the power modules 24, 26. Reference is now made to the FIG. 3 drawing which shows an additional stage of circuitry that includes the sample and hold network. The voltage input signal from the lead 66 is fed through resistor 80 to the differential amplifier 82. The differential amplifier 82 has an external RC timing network 84 and a plus and minus voltage for operating it. The function of amplifier 82 is to take the input voltage signal and divide that voltage by two. This is done so that a sample and hold can be done on either a positive or negative voltage. The actual sample and hold circuit includes the field effect transistor FET 86 and a capacitor 88, diode 90, and a resistor 92. The actual keying signal for the sample and hold circuit is derived from a comparator circuit which includes a differential amplifier 94. The amplifier 94 has attached to it suitable plus and minus voltage sources and an RC timing network 96.

With respect to the input for the amplifier 94, it is passed from the input lead 67 through inverter stages 98, 100, and through series resistor 102. The signal generated by inverters 98, 100 closely resembles the multivibrator 22 output signal.

When the signal occurring at diode 90 is a plus ten voltage signal, a sample operation occurs. When it's a minus ten voltage signal, the hold operation occurs. The capacitor 88 holds the voltage charge made during the sample period and retains it until the next sample pulse is received.

The amplifier 104 operates as a buffer amplifier stage to assist the capacitor 88 in holding its charge longer than the normal amplifier. The amplifier 104 is an FET input type amplifier. It typically has an extremely high input impedance and is also wired in a voltage follower configuration to give an even higher impedance. The output from amplifier 104 is fed to the plus input terminal of the next following amplifier 106. The amplifier 106 is used as an amplifier to multiply the voltage by two to return it to its original level as it existed before the amplifier 82. The output of the amplifier 106 is passed to successive sections of amplifiers 108 and 110 which comprise an absolute value circuit. This circuit performs a precision rectification of the signal so that the output of the third amplifier 110 is always a positive going signal without respect to the polarity of the input signal to the amplifier 106.

The amplifier 106 has connected to it a gain adjust rheostat 112 and a resistor 114 as shown. The amplifier 108 has a pair of signal diodes 114 and 116 with resistors 118 and 120 connected externally as shown. The amplifier 110 has connected to its lower or positive input terminal an adjust potentiometer 124 and a network including resistors 126 and 128 is connected in circuit.

Figure 3A:
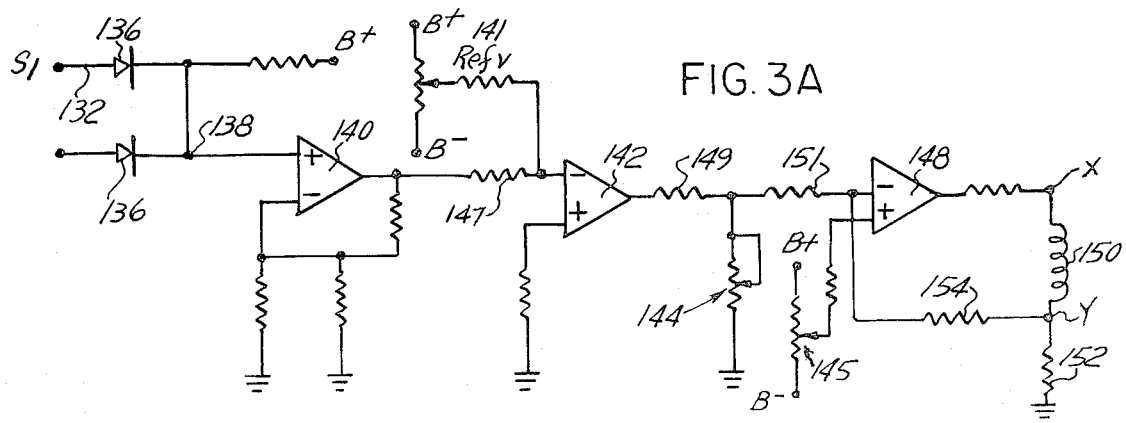
FIG. 3A is a schematic of the final servo control circuit and coil.

The pulse output from the output terminal of the amplifier 110 is passed through one or more additional amplifiers or stages 130 and to output lead 132 till it provides an input at terminal S1 as shown in FIG. 3A.

The circuit of FIG. 3A includes the final stages connected to the servo feed control coil for the servo motor used in the EDM machine tool. It includes amplifier stages 140, 142, and 148. Reference voltage potentiometer 141 is used to provide a variable reference voltage level. Gain adjust and offset potentiometers 144 and 145 are connected to the inputs of amplifier 148. Series resistor 147 is connected to the negative input terminal of amplifier 142. Series resistor 149 and 151 are connected in the input to the amplifier 148. In the circuit of FIG. 3A, the diode junction at point 138 operates as an analog "or" gate. The servo coil 150 is shown connected between points X and Y. The output of the amplifier 148 passes into the X terminal of the coil 150 and through and is then returned to ground through resistor 152. Feedback is applied through the resistor 154 to the upper input terminal of the amplifier 148.

DESCRIPTION OF OPERATION

The present invention will now be described with respect to an EDM setup which, as shown in FIG. 1, includes a plurality of split leads requiring a common servo feed drive downwardly as the machining progresses. The system shown in the drawings is capable of looking at the several different machining gaps involved and doing an analog "or" operation to determine which is the most valuable information signal to be used in the control of the servo feed. The circuit is designed to operate in either standard or reverse polarity. Depending whether machining is being conducted in the high voltage mode or in the standard voltage mode, switch 28 is operated to energize relay 32 as best shown in FIG. 1. In the high voltage mode of operation, relay contacts 32a will all be opened in order that all of the resistors 33 are effectively placed in series in the sensing leads. Voltages sensed from the several gaps are passed into the next following analog "or" circuit as best shown in FIG. 2 and labeled by the numeral 34. The voltage level among the several gap voltages sensed that is closest to zero voltage will be selected to operate the servo feed. The outputs of the several differential amplifiers 36 are passed to a column output lead and in accordance with the polarity setting predetermined on the differential amplifier 52, the voltage output will be made with the output at point T being positive when gap polarity is of the standard type. That voltage will be passed through resistors 58 and 60 to each side of the diode array comprising diodes 56. The voltage is then passed through lead 66 as an input to the FIG. 3 circuit to amplifier 82. At this stage, the voltage is divided by two and passed into a sample and hold circuit comprising FET 86, resistor 92, capacitor 88, and diode 90. At the same time, a pulse input is being taken in on lead 67 to provide a drive signal which is exactly in phase with the multivibrator output signal delayed by some preset time as predetermined by potentiometers 72 and 74. Thus, when the signal output through diode 90 is plus we sample the voltage level on lead 66. When the signal at diode 90 is a minus ten voltage it is a hold situation. The capacitor 88 holds the voltage to which it was charged during the sample until the next sample pulse occurs.

The control signal is then multiplied by a factor of two by amplifier 106 to return it to its original level as it existed before the amplifier 82. It then passes through subsequent stages of amplifiers 108 and 110 which makes up an absolute value circuit which perform a precision rectification. Thus, the output of amplifier 110 is always a positive going signal without respect to the polarity of the input signal. The servo control signal is then passed to one or more amplifier stages 130 through lead 132 to the left-hand input terminal of the servo feed control circuit shown in FIG. 3A. Here the signal is summed with the reference signal is summed with the reference signal and the gain potentiometer signal and used to control the operation of the coil 150. This coil, as is well known in the EDM art, forms the basic operating element of an electromagnetic servo system and a suitable hydraulic motor, not shown, as used to control the movement of electrodes relative to workpiece. In the interest of simplification and brevity, the entire detail of the control servo drive system is not included.

It will thus be seen that we have provided by our invention an improved servo feed control system for split or multiple electrode electrical discharge machining.

We claim:

1. In an electrical discharge machining circuit with a workpiece and a relatively movable electrode and having the capability of both high voltage level machining power pulses and low voltage level machining power pulses, a switching means for changing operation between such high and low voltage levels, a servo feed system including a gap voltage sensing lead connected to the gap; a reference voltage source; an electrically energized element coupled to said lead and to said reference voltage source; a motive means, said electrically energized element operable to control the operation of said motive means and thus the movement of the electrode responsive to the difference between said gap and reference voltages; and a second switching means conjointly operable with said first switching means for switching said resistor into operable position in said sensing lead responsive to changeover from low to high voltage level operation.

2. The combination as set forth in claim 1, wherein said second switching means comprises a relay, said relay having a movable contact operable and actuated to shunt said resistor in said sensing lead during relatively low voltage operation.

3. The combination as set forth in claim 1, wherein said electrical discharge machining circuit includes separate high voltage and low voltage output modules.

4. The combination as set forth in claim 3, wherein said first switching means is connected in series with said high voltage output module for connecting it to the gap for such high voltage operation.

5. A servo feed system for an electrical discharge machining apparatus selectively operable at high and low voltage levels having a multiple electrode gap setup, comprising: a plurality of gap voltage sensing leads, each connected to a different one of said gaps and having a resistor switchable in or out of circuit depending on such selected voltage level; a reference voltage source; a motive means for moving said electrodes toward the workpiece during working; an electrically energized element operably connected to said motive means for controlling its operation; an analog "or" gate connected intermediate said sensing leads and said element; said analog "or" gate comprising a like plurality or of differential amplifiers for selecting the appropriate one of said sensed voltages and connecting it to said element, a further diode array connected between said analog "or" stage and said element for providing a signal to it of the appropriate polarity; an operational amplifier having its output connected to the combined outputs of said array for providing such signal; and a further sample and hold circuit including a field effect transistor having its principal electrodes connected between the output of said diode array and one terminal of said element for providing a high impedance thereto for keying its operation with machining power pulses.

6. A combination, as set forth in claim 5, wherein a further sample and hold circuit is operably connected to said FET for retaining a sample of the previous pulse until a new one is received.

7. The combination, as set forth in claim 6, wherein said sample and hold circuit includes a diode and a capacitor for storing a voltage representation of the last pulse.

8. The combination, as set forth in claim 6, wherein said sample and hold circuit is keyed in phase with each machining on-time pulse.

* * * * *